July 21, 1931. N. BARRY 1,815,663

SOLID PRESSED STEEL PULLEY

Filed May 24, 1929 2 Sheets-Sheet 1

Inventor:
Nicholas Barry
By Alexander Powell
Atty's.

July 21, 1931.  N. BARRY  1,815,663
SOLID PRESSED STEEL PULLEY
Filed May 24, 1929  2 Sheets-Sheet 2
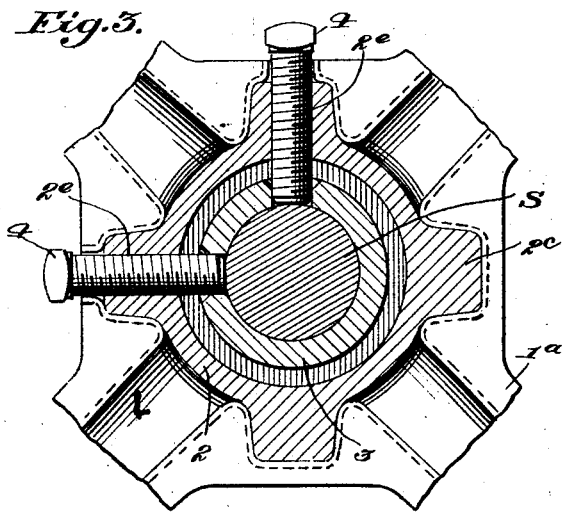
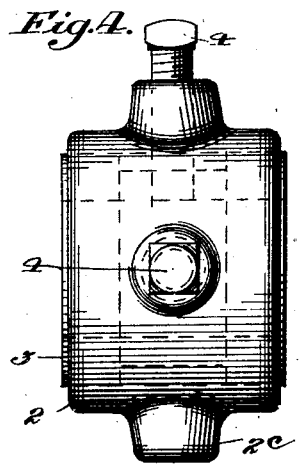
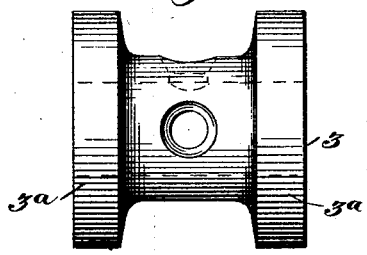
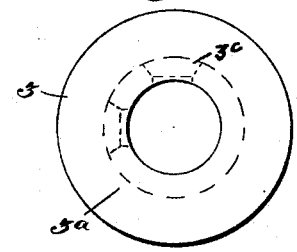
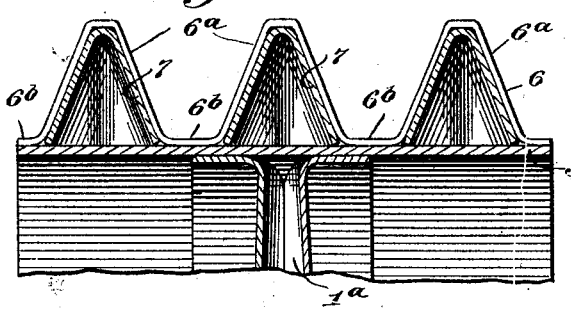
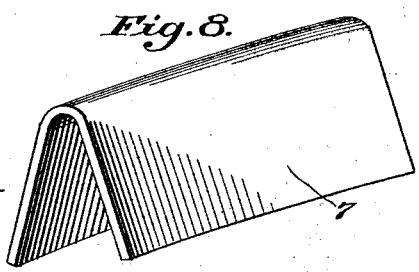

Patented July 21, 1931

1,815,663

UNITED STATES PATENT OFFICE

NICHOLAS BARRY, OF MUSCATINE, IOWA

SOLID PRESSED STEEL PULLEY

Application filed May 24, 1929. Serial No. 365,729.

This invention is a novel improvement in so called solid or non-split pressed steel pulleys, such as are ordinarily made out of sections of pressed steel inseparably united by riveting or welding. Some of such pulleys have heretofore been provided with a cast metal hub portion bored to fit the shaft upon which the pulley is to be mounted, and such pulleys can not be used on a larger size shaft unless rebored, and can not be made to fit a smaller shaft after boring.

The principal object of the present invention is to provide a solid non-split pressed steel pulley with a master bushing and removable interchangeable bushings, whereby such a pulley can be readily mounted upon shafts of varying size and diameters. In my invention the master bushing is permanently fitted and secured within the hub of the pulley and is provided with radial lugs engaging the hollow spokes of the pulley and adapted to receive set screws, which engage and retain the interchangeable bushing within the master bushing, and also to secure the pulley on the shaft.

A further object of the invention is to provide such pulleys with M-shaped or W-shaped metal members fitted to the rim of the pulley and secured thereto by riveting or welding, and forming annular grooves in the periphery of the pulley, the construction being such as will prevent the curved steel parts from springing under a heavy load which would tend to grip the chain or cable in the groove and consume power in extricating the chain or rope from the groove.

In the accompanying drawings I have illustrated pulleys embodying the invention and will first describe the same with reference thereto to enable others to adopt and use the same; and thereafter summarize in the claims the novel features of construction and novel combinations of parts for which protection is desired.

In said drawings;

Fig. 3 is a detail section on the line 3—3 Fig. 2.

Fig. 4 is a side view of the master bushing and the interchangeable bushing, detached from the pulley.

Figs. 5 and 6 are side and end views of the interchangeable bushing detached.

Fig. 7 is a detail view of a plural grooved pulley rim.

Fig. 8 is an enlarged detail view of the connection between the sections of the channel members forming the groove.

Figure 2:
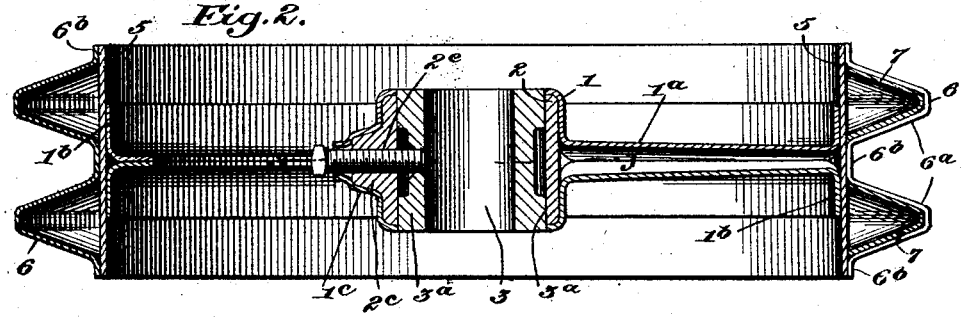
Fig. 2 is a section on the line 2—2, Fig. 1.

The body of the pulley may be of any suitable pressed steel construction being shown as formed of similar opposite pressed halves each comprising a hub portion 1, spoke members 1a and rim member 1b, and the hub portion is also provided intermediate the spoke members 1a with short radially disposed hollow projections 1c which may all be formed integral and pressed out of one piece of steel. The two opposite halves being formed alike but complemental so that when placed together they form a hollow hub with hollow spokes and a divided rim portion as indicated in Fig. 2. The inner or meeting faces of the hub spoke and rib members of the opposed sections when united, by welding or riveting or otherwise, form an integral hollow pressed steel pulley body. The rim, spoke members, hub and projections of each half of the pulley are preferably provided on their meeting edges with integral stiffening flanges as shown, which flanges facilitate uniting the parts and also materially stiffen the wheel in the central plane thereof.

Figure 1:
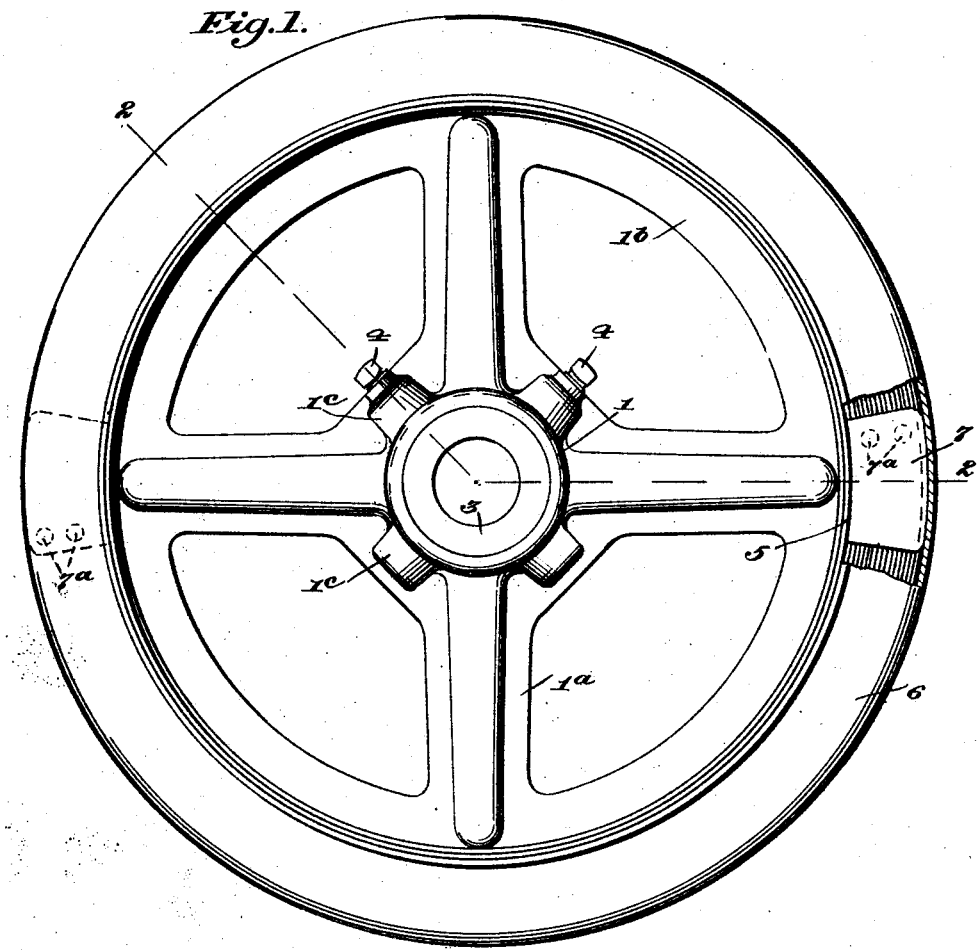
Fig. 1 is a side view partly broken away of a complete pulley and bushing embodying the invention.

The hollow projections 1c form sockets for the reception of radial lugs 2c on a master bushing 2 which is shaped to closely fit within the hollow hub portion of the pulley, as indicated in Figs. 1, 2 and 3. The lugs 2c engaging the recesses 1c effectually prevent relative rotatorial movement of the master bushing and the pulley and the master bushing forms a solid hub center for the pulley. Two or more of the lugs 2c may be provided with radial bores 2e which are internally threaded for engagement with radially disposed bolts 4, which extend through openings in the hub and are tapped into the lugs 2c in the master bushing. Bolts 4 are adapted to be screwed into engagement with the shaft S upon which the pulley is mounted, and also engage the interchangeable bushing 3 which is fitted within the master bushing 2.

In the construction shown the pulley has but four spokes but may be provided with any desired number of spokes and any desired number of radial recesses; and the master bushing should be correspondingly exteriorily shaped to fit within the pressed steel hub portion and form a solid hub center and be non-rotatably and irremovably secured therein by the uniting of the opposed sections of the pulley. Obviously the opposed pressed steel sections of the pulley may also be made in one or more pieces and for economy of construction according to the size of the pulley and united by welding or riveting as is obvious.

The master bushing 2 is truly bored axially of the pulley for the reception of interchangeable bushings 3, which are preferably shaped as indicated in Figs. 5 and 6 and have cylindric end portions 3a which fit closely within the bore of the master bushing 2 and truly center the interchangeable bushing therein. Said interchangeable bushing may be reduced intermediate the portions 3a and is provided with two or more radially disposed holes 3c which are adapted to be engaged by the inner ends 4c of the bolts 4 when the interchangeable bushing is inserted in position in the master bushing.

Preferably the outer end of the holes 3c are conical, as shown in the drawings, and the inner ends of the tap bolts 4 are also slightly conical, so that in case the openings in the interchangeable bushing 3 should not be in direct axial alinement with the bolts 4 when the bolts 4 are screwed inward their beveled ends engaging the beveled ends of the openings 3c will shift the bushing 3 to correct position within the master bushing 2 and the ends of said bolts can pass through the openings 3c and directly engage the shaft S on which the pulley is mounted.

The shafts on which the pulley is to be mounted may vary in size and therefore interchangeable bushings 3 are provided so that a pulley of any given diameter may be mounted on a shaft of any given size by simply placing within the master bushing in the pulley an interchangeable bushing 3 whose bore corresponds in diameter to the shaft upon which the pulley is to be mounted.

By this means the solid pressed steel pulleys can be economically made of standard size, and with master bushings having a bore of a standard size, and all that is required in order to mount it on any desired diameter of shaft, is to place in the master bushing an interchangeable bushing having the proper bore; thus instead of having to keep a large number of pulleys of different bores in stock it is only necessary to keep a number of interchangeable bushings in stock, and any pulley of any diameter can be readily fitted to a shaft of any diameter by employing the proper interchangeable bushing in such pulley.

The bolts 4 not only secure the interchangeable bushing 3 in the master bushing 2 but they also securely lock the pulley on the shaft against both rotatorial and longitudinal movements. By providing a plurality of the bolts 4 it will not be necessary to key the pulley to the shaft as the bolts will hold the pulley rigidly and immovably in position on the shaft.

The rim of the pulley is ordinarily made by attaching thereto an annular rim member 5 of any desired width and which may be of heavier sheet metal than that out of which the body members 1—1a—1b are made. If the pulley is to be a plain belt pulley the member 5 is sufficient. Where a sheave or grooved pulley is desired pressed sections 6 are secured to and around the rim member 5. These members 6 are approximately M-shaped or W-shaped in cross section, and have a plurality of circumferential parallel V-shaped projections 6a, and the space between the adjacent sections 6a forms a groove for engagement of a chain or rope. The sections 6a may be spaced any desired distance apart, according to the desired width of the groove to be formed. If more than one groove is to be formed in the pulley then additional projections 6a may be formed in the members 6. The members 6 are provided with flat portions 6b at the base of the projections 6a which fit against the outer periphery of the rim member 5 and may be secured thereto by riveting or welding. The grooved members 6 may be made in curved sections of any desired length, the sections shown being 180 degrees in length, and to keep the ends of the sections in exact alinement and to prevent the bends breaking down at the junction of the sections, they may be provided with sheet metal dowels 7, V-shaped in cross section, which are entered in the end of one section and riveted or welded thereto, as indicated at 7a, and the projecting ends of these dowels are adapted to enter the end of the adjacent grooved section 6a, as indicated in Figs. 1 and 8.

The sides of the V shaped members 6 act as braces and prevent the sides of the groove springing apart, which they might otherwise do under heavy load; and should any such spring take place it would require extra power to operate the pulley and make the operation jerky. Solid pressed steel pulleys such as described can be readily made, either belt or sheave, and are easily attachable to shafts of various sizes as hereinbefore explained; and such pulleys are light, strong, easily installed, economical in construction, and reliable in operation.

The set screws, which hold the interchangeable bushings and also secure the pulley on the shaft, are preferably placed between the spokes as shown, and while easily accessible are not liable to catch the clothing of workmen, as are the set screws as now used on the end of the hubs of solid pulleys apt to do. By placing the set screws between the spokes and at the central line of the hub as indicated in the drawings, this danger is practically obviated.

I claim:

1. A sheet metal pulley having a hub portion provided with spoke members and with hollow radially disposed projections intermediate the spoke members, a bushing fitted within said hub portion and having peripheral radial projections entered into the said hollow projections of the hub, one of said lugs having radial openings for passage of a bolt.

2. A solid pressed steel pulley having hollow hub spoke and rim members and radially disposed hollow projections on the hub member intermediate the spoke members, a master bushing within said hollow hub provided with radially disposed lugs entering said hollow projections, a removable bushing fitted within the master bushing, and a radial bolt passing through one of said hollow projections, the lug therein, and both bushings, to fasten the pulley to the shaft.

3. A solid pressed steel pulley comprising similar opposite halves each having a hollow hub portion, hollow spoke members and a rim member; said hub portion being provided with radially disposed hollow projections intermediate the spoke members; a bushing in the hollow hub having radially disposed lugs engaging the recesses in the hollow projections, one of said lugs having a radially disposed threaded bore; and a radially disposed tap bolt engaging said bore fastening the pulley to a shaft.

4. A solid pressed steel pulley comprising opposite complemental halves each having a hollow hub portion, hollow spoke members and a rim member, said hub portion being provided with radially disposed hollow projections intermediate the spokes, and meeting flanges on the opposed edges of the spoke members and hub portion and projections; a cast metal master bushing in the hollow hub having radially disposed lugs engaging the recesses in the hub portion, one of said lugs having a radially disposed threaded bore; a radially disposed tap bolt engaging said bore; and a changeable bushing fitted in the master bushing and provided with a radial opening adapted to be engaged by the said bolt; said bolt retaining the changeable bushing in place in the master bushing and also fastening the pulley to the shaft.

NICHOLAS BARRY.